US 7,827,380 B2

(12) United States Patent
Hepkin et al.

(10) Patent No.: US 7,827,380 B2
(45) Date of Patent: *Nov. 2, 2010

(54) METHOD AND APPARATUS FOR SUPPORTING SHARED LIBRARY TEXT REPLICATION ACROSS A FORK SYSTEM CALL

(75) Inventors: David Alan Hepkin, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/264,697

(22) Filed: Nov. 4, 2008

(65) Prior Publication Data
US 2009/0055623 A1 Feb. 26, 2009

Related U.S. Application Data

(63) Continuation of application No. 10/897,329, filed on Jul. 22, 2004, now Pat. No. 7,469,331.

(51) Int. Cl.
*G06F 9/26* (2006.01)
*G06F 9/44* (2006.01)
(52) U.S. Cl. ...................... 711/202; 719/312
(58) Field of Classification Search ................ 719/310, 719/312; 718/104, 105; 711/147, 202, 206; 712/203
See application file for complete search history.

(56) References Cited

U.S. PATENT DOCUMENTS

| 5,093,913 | A | | 3/1992 | Bishop et al. | |
|---|---|---|---|---|---|
| 5,325,530 | A | | 6/1994 | Mohrmann | |
| 5,369,749 | A | | 11/1994 | Baker et al. | |
| 5,627,987 | A | | 5/1997 | Nozue et al. | |
| 5,717,926 | A | * | 2/1998 | Browning et al. | 718/104 |
| 5,890,189 | A | | 3/1999 | Nozue et al. | |
| 6,049,853 | A | | 4/2000 | Kingsbury et al. | |
| 6,148,323 | A | * | 11/2000 | Whitner et al. | 718/105 |
| 6,311,265 | B1 | * | 10/2001 | Beckerle et al. | 712/203 |
| 6,470,375 | B1 | * | 10/2002 | Whitner et al. | 718/105 |
| 6,970,991 | B2 | * | 11/2005 | Harman | 711/206 |
| 7,020,753 | B2 | * | 3/2006 | Shanahan et al. | 711/147 |
| 2003/0088752 | A1 | | 5/2003 | Harman | |

OTHER PUBLICATIONS

SunOS man pages:fork(2), Jul. 23, 2001, Sun Microsystems, Inc., pp. 1-3.
SunOS man pages:atexit(3C), Jul. 23, 2001, Sun Microsystems, Inc., pp. 1-2.

* cited by examiner

*Primary Examiner*—Van H Nguyen
(74) *Attorney, Agent, or Firm*—Yee & Associates, P.C.; Diana R. Gerhardt

(57) ABSTRACT

A fork system call by a first process is detected. A second process is created as a replication of the first process with a second affinity. If a replication of the replicated shared library is present in the second affinity domain, effective addresses of the replication of the replicated shared library are mapped using a mapping mechanism of the present invention to physical addresses in the second affinity domain.

20 Claims, 5 Drawing Sheets

|  |  | AFFINITY DOMAIN 0 | | AFFINITY DOMAIN 1 | |
|---|---|---|---|---|---|
| LIBRARY A 502 | EFFECTIVE ADDRESS 504 | VIRTUAL ADDRESS 506 | PHYSICAL ADDRESS 510 | VIRTUAL ADDRESS 508 | PHYSICAL ADDRESS 512 |
| PROCESS 1 | 0x1000 | A | W | C | Y |
| PROCESS 2 | 0x1000 | B | X | D | Z |

METHOD AND APPARATUS FOR SUPPORTING SHARED LIBRARY TEXT REPLICATION ACROSS A FORK SYSTEM CALL

This application is a continuation of application Ser. No. 10/897,329, filed Jul. 22, 2004, now U.S. Pat. No.: 7,469,331.

BACKGROUND OF THE INVENTION

1. Technical Field

The present invention relates to a data processing system. In particular, the present invention relates to supporting shared library text replication in a data processing system. Still more particularly, the present invention relates to a method and apparatus that supports shared library text replication across a fork system call.

2. Description of Related Art

Under most UNIX environments, a system call named fork is provided to replicate a process to create a new process. One of these environments is Portable Operating System Interface (POSIX). POSIX is a standard published by IEEE that describes a UNIX-based system call interface that supports multiple platforms. POSIX includes a programming model that handles multithreading. A thread is a process or task managed by the kernel or the operating system. When multiple threads are executing at the same time, each thread may execute in another thread's address space.

In POSIX, a fork system call causes a process to create an exact copy of itself. The fork system call creates a new process called a child process. The original process is called a parent process. The child process has its own process identifier and address space. Thus, using the fork system call, an application may create copies of executable program code in many different physical memory locations at the same time. The replication of executable program code is known as text replication.

Text replication may not be difficult to implement in applications that have no shared state between a parent and a child process. The child and parent processes may each have its own address space, which allows the text addresses to be different in the parent and the child. Many applications use exec system call immediately after the fork system call, which loads a new program code, instead of using the fork system call to provide an alternative mechanism for replicated text.

However, text replication may be difficult to implement in applications that require data sharing between parent and child processes. An example of these applications includes DB2 Universal Database, a product available from International Business Machines Corporation. These applications often use fork system calls to instantiate their work. The use of fork system calls requires each child and parent process to have the same effective or program addresses, while each replicated shared library may be optimized to have different physical addresses local to the shared library's affinity domain. An affinity or memory domain is a group of processors and a region of memory that is local to the group of processors and is most efficiently accessed by the group of processors.

Furthermore, the shared libraries are accessed globally by different applications and programs on the system. Therefore, it would be advantageous to have a mechanism that can transparently replicate text or shared library code for new processes created by the fork system call.

SUMMARY OF THE INVENTION

The present invention provides a method, apparatus and computer instructions for supporting shared library text replication across a fork system call. The present invention detects a fork system call by a first process with a first affinity domain and creates a second process as a replication of the first process. The present invention then selects a second affinity domain for the second process. Upon determining that a replication of the replicated shared library is present in the second affinity domain, the present invention maps effective addresses of the replication of the replicated shared library to physical addresses in the second affinity domain.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
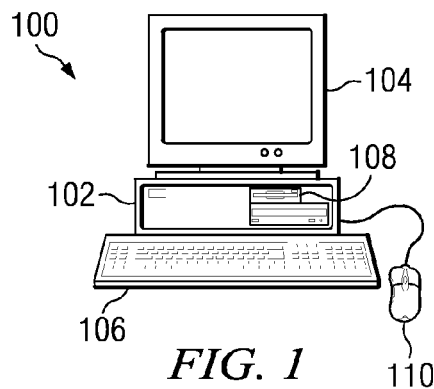
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
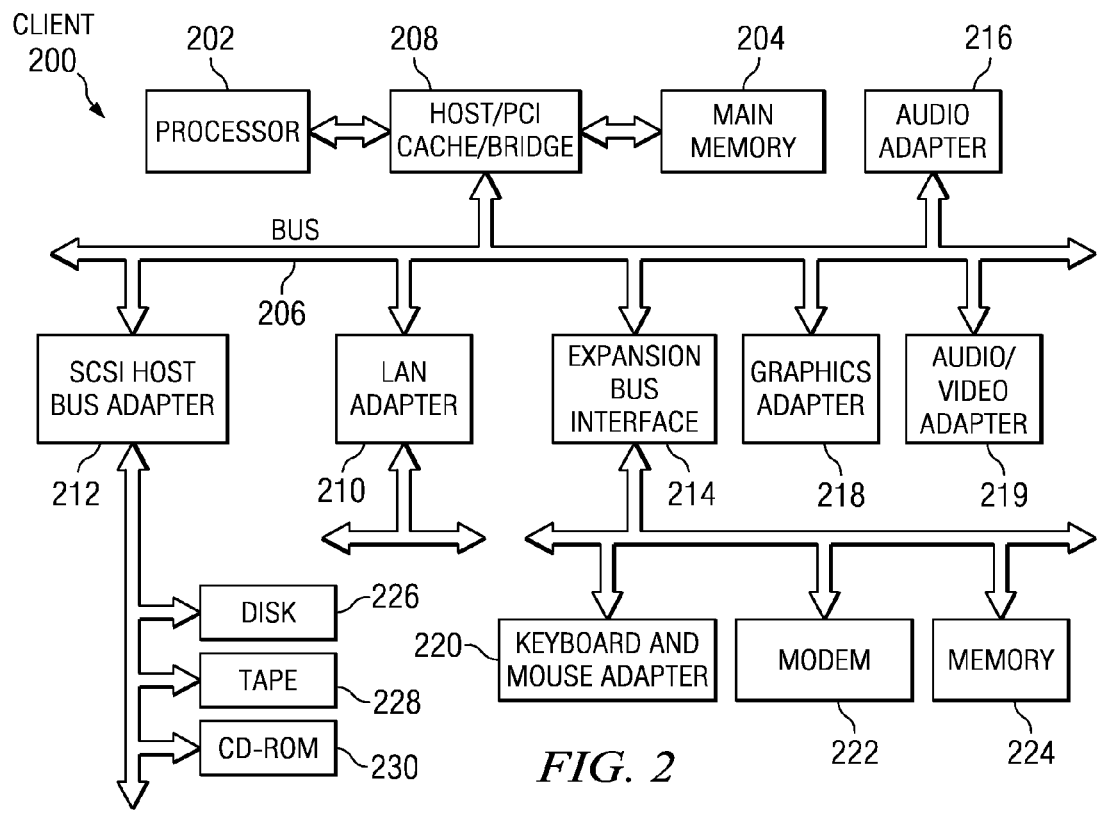
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus and computer instructions for supporting shared library text replication across a fork system call, such as a POSIX fork system call. The present invention provides a mapping mechanism that maps process or effective addresses that represent text or shared library code to multiple physical addresses for the target objects based on an affinity domain. Target objects maybe, for example, text or shared libraries.

For each shared library, the operation system maps one copy of physical pages per affinity domain. Thus, on a 32-way system with 4 affinity domain, there are up to 4 unique copies of each replicated library. Each copy of physical pages may then be mapped to virtual memory, such that unused portions of the shared library code will not require physical memory until the code is accessed.

The mapping mechanism of the present invention uniquely identifies a set of virtual mapping for a set of physical pages. The set of virtual mapping includes a range of virtual addresses that is associated with a particular affinity domain. For example, a virtual address range of 0×1000 to 0×10000 is associated with affinity domain 0. The set of physical pages includes multiple physical addresses that include actual instructions and data of the processes.

When an application invokes a fork system call, the present invention determines if the parent process has mapped any of the target objects, such as text or shared libraries. This call happens when one or more threads of the parent process are executing and the child process is not yet running. If the parent has mapped one or more target objects, the child process may use the mapping mechanism provided by the present invention to map the effective addresses to the physical addresses on the target object's affinity domain. In this way, the child process's effective address is identical to the parent process, but the physical address of the child process is unique.

In addition, the present invention may also be used to migrate a process from one affinity domain to another, in order to achieve text affinity. When a process's execution involves its movement from one affinity domain to another, the operating system may detect this movement and change the effective to virtual mapping using the mapping mechanism of the present invention to allow shared library mapping to the new affinity domain. Thus, using this mapping mechanism, the program is no longer required to access virtual mapping from the previous affinity domain. Accessing local memory instead of remote memory results in superior performance.

Figure 3:
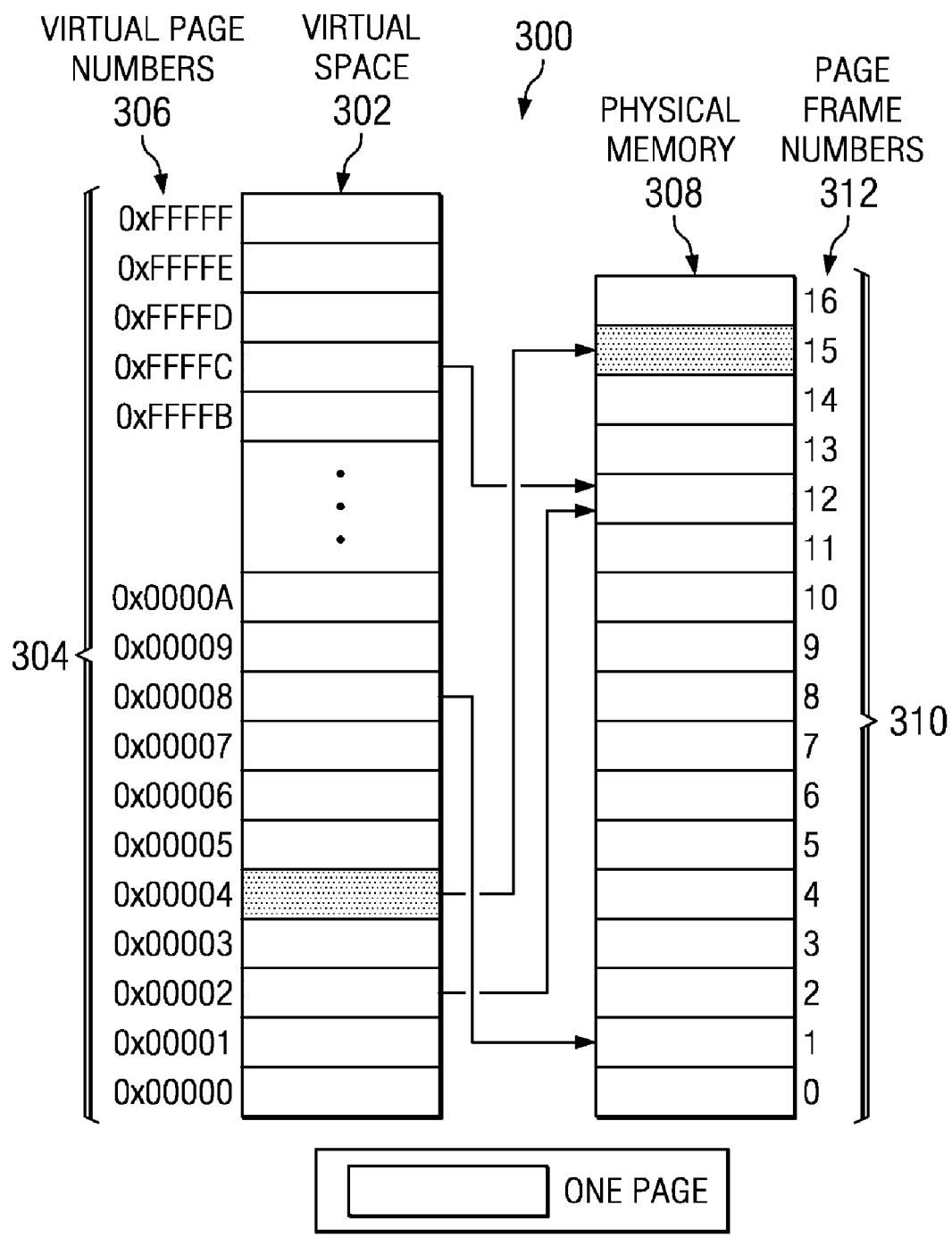
FIG. 3 is a diagram illustrating basic concepts of virtual and physical memory in accordance with a preferred embodiment of the present invention.

Turning now to FIG. 3, a diagram illustrating basic concepts of virtual and physical memory is depicted in accordance with a preferred embodiment of the present invention. As shown in FIG. 3, a data processing system, such as data processing system 200 in FIG. 2, may include a virtual memory system 300. Virtual memory system 300 creates an illusion of single-level store with access time of random access memory rather than that of a disk. Virtual memory space 302 is divided into uniform virtual pages 304, each of which is identified with a virtual page number 306. Physical memory 308 is divided into unique page frames 310, each identified by a page frame number 312. Page frames 310 hold program instructions or data. Generally, a given virtual page can only have one physical location. However, it is possible to have several virtual pages mapped to the same page frame.

Figure 4:
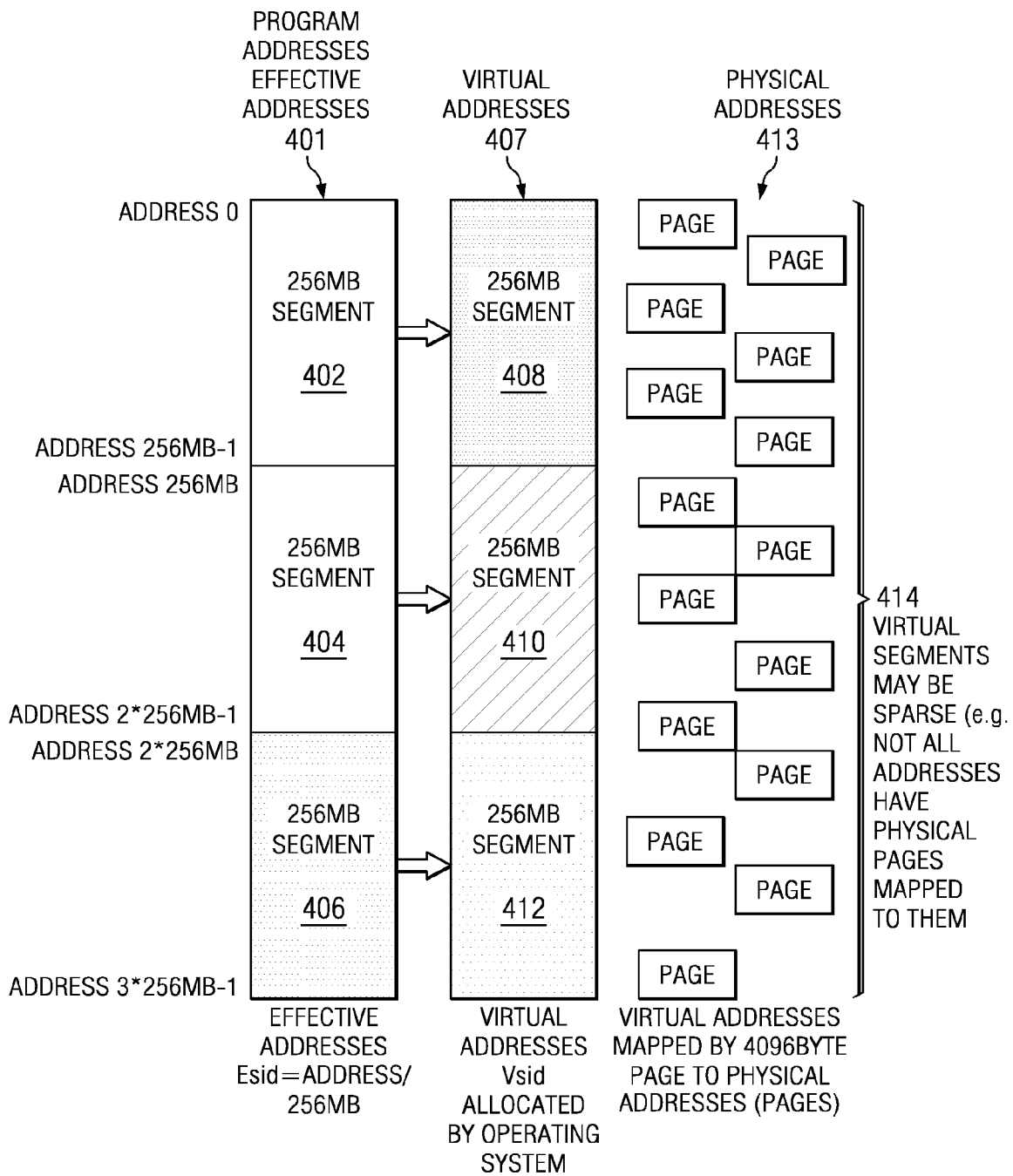
FIG. 4 is a diagram illustrating an exemplary implementation of address mapping in a POWERPC microprocessor architecture in accordance with a preferred embodiment of the present invention

Turning now to FIG. 4, a diagram illustrating an exemplary implementation of address mapping in POWERPC microprocessor architecture is depicted in accordance with a preferred embodiment of the present invention. As illustrated in FIG. 4, POWERPC microprocessor, a product available from International Business Machines Corporation, may be implemented in processor 202 of data processing system 200 in FIG. 2.

In the POWERPC microprocessor architecture, a process address space may be composed of many contiguous regions of virtual memory space known as segments. In this example, there are 3 segments: segment 402, 404, and 406. Segments are typically, but not necessarily larger than pages and each segment is 256 MB in size. Therefore, segment 402 has address starting from 0 to 256 MB−1. Typically, in the POWERPC microprocessor architecture, address mapping are performed in two stages.

In the first stage, effective or program addresses 401 are mapped into virtual addresses 407 in the granularity of segments. The hardware may provide a register to hold the process's effective and virtual segment identifiers. The effective segment identifiers may be determined by dividing the effective address by 256 MB. The virtual segment identifiers may be allocated by the operating system. Once the mapping of the first stage is complete, virtual address space now includes 3 corresponding segments of virtual addresses 407: segment 408, 410, and 412.

In the second stage, virtual addresses 407 in the virtual memory space are mapped onto physical addresses 413 in the granularity of pages 414. In this example, virtual addresses 407 of segments 408, 410, and 412 are mapped to pages 414 of physical addresses 413. Pages 414 are each 4096 byte in size. Virtual segments 408, 410, and 412 may be sparse, since not all addresses have physical pages mapped to them.

Thus, in the POWERPC microprocessor architecture, virtual mapping can be performed easily as the architecture itself provides a mapping from effective segments to virtual segments and from virtual segments to physical pages.

Figures 5, 6:
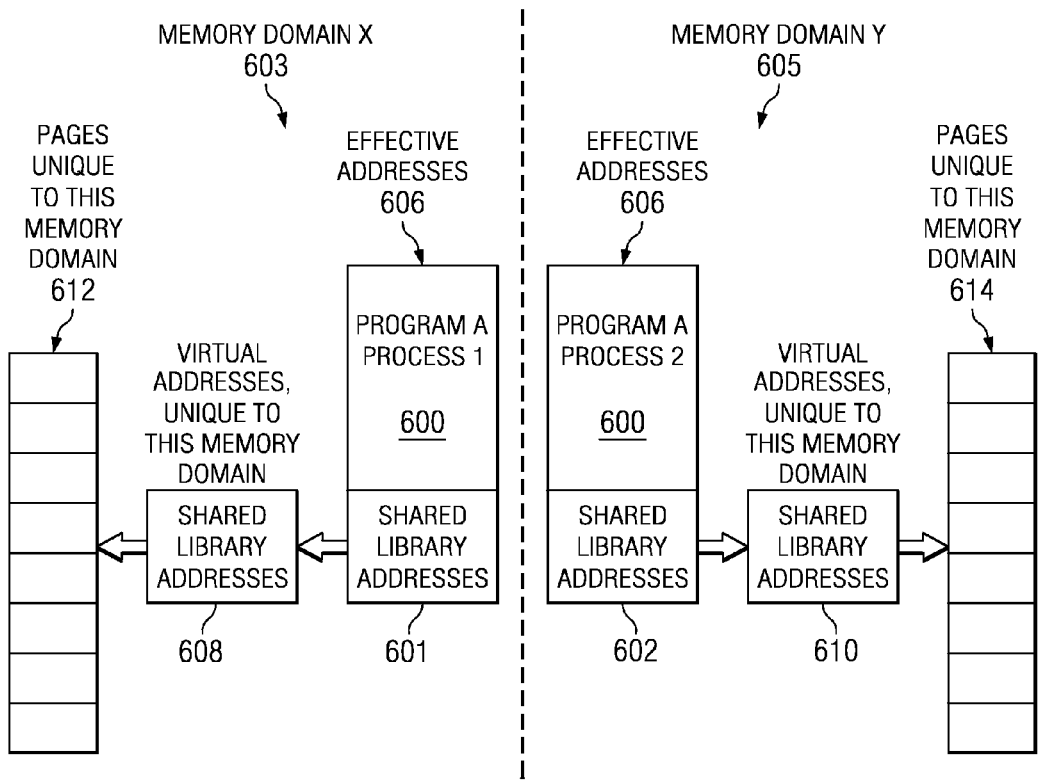
FIG. 5 is a diagram illustrating an exemplary implementation of a mapping mechanism that maps effective addresses to physical addresses in accordance with a preferred embodiment of the present invention.
FIG. 6 is a diagram illustrating an exemplary shared library replication using the mechanism of the present invention in accordance with a preferred embodiment of the present invention.

Turning now to FIG. 5, a diagram illustrating an exemplary implementation of a mapping mechanism that maps effective addresses to physical addresses is depicted in accordance with a preferred embodiment of the present invention. As illustrated in FIG. 5, process 1 and process 2 both require shared library A 502, which is replicated with the same effective address 504 of 0×1000. The present invention provides a mapping mechanism that maps virtual code addresses to physical addresses on the target affinity domain.

In this example, there are two affinity domains: affinity domain 0 and affinity domain 1. Each of virtual addresses 506 in affinity domain 0 are unique. Thus, virtual addresses A and B are unique to affinity domain 0. Similarly, virtual addresses 508 in affinity domain 1 are unique. Thus, virtual addresses C and D are unique in affinity domain 1.

Based on this virtual mapping that is unique in each affinity domain, mapped physical address for each process also is unique to specific affinity domain. For example, physical addresses 510 are unique in affinity domain 0 and physical addresses 512 are unique in affinity domain 1. Thus, physical addresses W and X are each unique in affinity domain 0 and physical addresses Y and Z are each unique in affinity domain 1.

Turning now to FIG. 6, a diagram illustrating an exemplary shared library replication using the mechanism of the present invention is depicted in accordance with a preferred embodiment of the present invention. As shown in FIG. 6, program a 600 may invoke a fork system call to create a child process. When the fork system call is invoked, process 2 is created as a child of process 1. When process 2 is created, an affinity domain is selected for the new process, in this example, memory domain Y 605.

Since process 1 requires a replicated shared library, in this example, shared library 601, if no replicated shared library is present in process 2, replicate shared library 602 is created for process 2. Both shared libraries 601 and 602 share the same effective address 606. The present invention then performs a mapping of effective addresses 601 and 602 to physical addresses by first mapping effective addresses 601 and 602 to virtual addresses. This mapping may be accomplished by mapping each effective address to a different virtual address that is unique to the specific memory domain.

For example, effective address 601 is mapped to virtual address 608, which is unique to memory domain X 603. Effective address 602 is mapped to virtual address 610, which is unique to memory domain Y 605. In the POWERPC microprocessor architecture, this uniqueness may be achieved by assigning unique virtual segment identifiers (VSIDS) while maintaining the same effective segment identifiers (ESID). In addition, it is inexpensive to switch mapping using the virtual addresses, since each segment is only 256 MB in size.

After the virtual addresses 608 and 610 are mapped, the present invention completes the mapping by mapping virtual addresses 608 and 610 to pages of physical addresses that are unique to the specific memory domain. In this example, virtual address 608 is mapped to pages 612, which are unique to memory domain X 603. Virtual address 610 is mapped to pages 614, which are unique to memory domain Y 605.

Once the mapping is complete, the effective addresses of both processes remain the same, while their mapped virtual and physical addresses are different.

Figure 7:
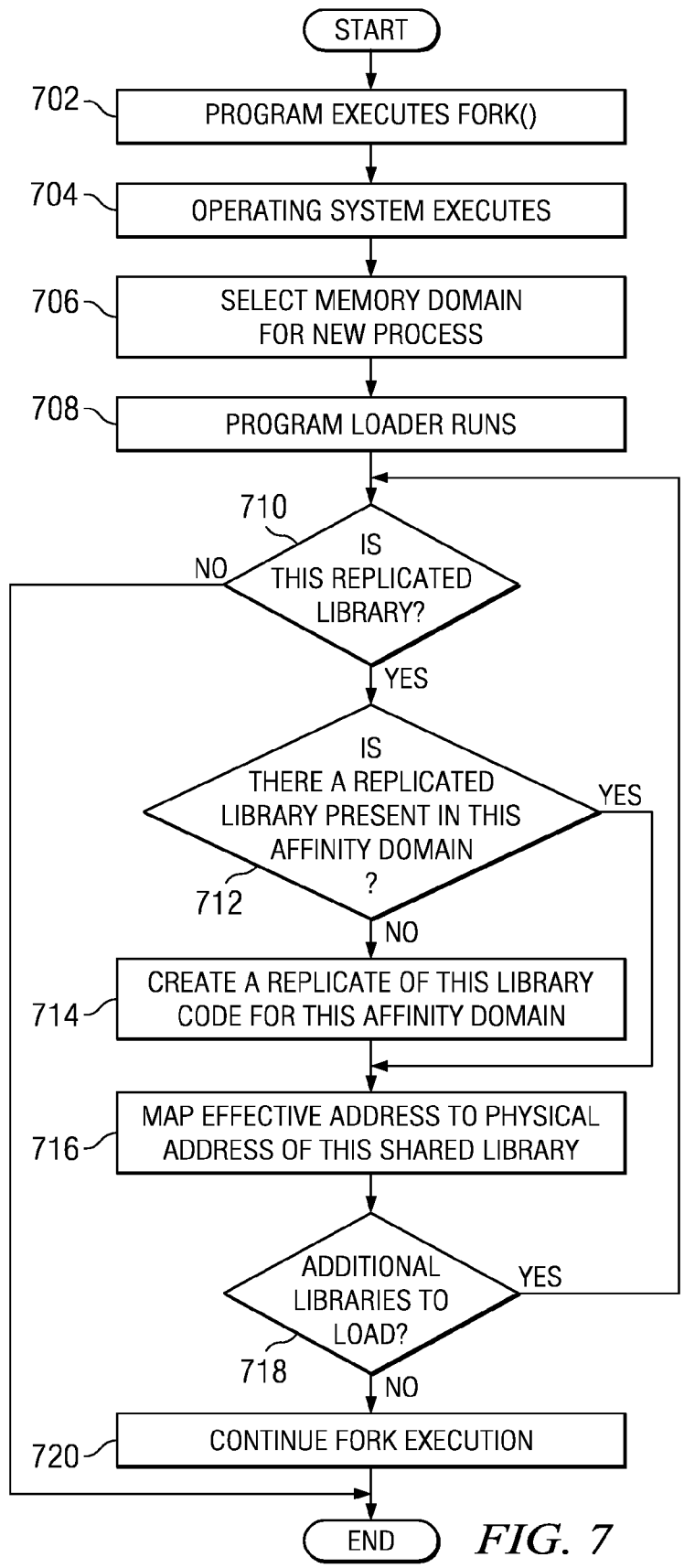
FIG. 7 is a flowchart of a process for supporting shared library text replication across a POSIX fork system call in accordance with a preferred embodiment of the present invention.

Turning now to FIG. 7, a flowchart of a process for supporting shared library text replication across a POSIX fork system call is depicted in accordance with a preferred embodiment of the present invention. As depicted in FIG. 7, the process begins when a program executes a fork system call (step 702). The operating system then executes the call (step 704) to create a new child process. When the child process is created, the operating system selects a memory or affinity domain for the child process (step 706).

Next, the program loader runs to determine what programs to run (step 708). These programs may include text and shared libraries. A determination is then made by the operating system as to whether the required shared library is a replicated shared library in the parent process (step 710). A replicated shared library is a shared library that may be shared by both parent and child processes, or more generally all of the processes in the system. When the child process is first created, it inherits the same effective address that points to the shared library, even though the child process has its own address space. The operating system may choose to replicate selected libraries or all libraries. The criteria for replication may be based on dynamic criteria, such as, for example, library size, number of processes using the library, and available system memory.

The operating system determines whether the required shared library is a replicated shared library by examining a selectable attribute, which may be an attribute of the shared library. If the required shared library is a replicated shared library, the process continues to step 712. Otherwise, the process terminates thereafter.

At step 712, a determination is made by the operating system as to whether a replication of the replicated shared library is present in the affinity domain of the child process. The operating system determines whether a replication of the replicated library is present by, for example, examining the affinity domain associated with the child process for the effective address of the replicated shared library, or by examining a data structure attached with each shared library. If no replication is present, the operating system creates a replicate of the replicated shared library for this affinity domain (step 714) and the process continues to step 716. If a replication is present in the affinity domain of the child process, the process also continues to step 716.

At step 716, the operating system maps the effective addresses to physical addresses for the replicated shared library in the affinity domain of the child process. Once the replicated shared library is mapped, a determination is made by the program loader as to whether additional libraries need to be loaded (step 718). If additional libraries need to be loaded, the process returns to step 710 to determine if the next shared library is a replicated shared library. If no additional libraries need to be loaded, the process continues with the fork system call to reach its logical conclusion (step 720).

When an affinity domain is selected for the new process, a target processor or a set of processors associated with the affinity domain is selected. For each copy of the replicated shared library, a usage count is kept in order to determine the number of processes associated with each mapping. Each time the target processor performs a POSIX exit call, which exits the process terminating all of its threads, the usage count is decremented. The replicated share library may not be unloaded or logically replaced until the usage counts of all affinity domains are zero, meaning that no processes are running under the replicated shared library.

In addition to shared library clean up, memory domain may also be disassociated from the shared library when the shared library is unloaded. Furthermore, selective or partial clean up may be performed to selectively remove a particular shared library or memory domain.

In summary, the present invention provides a mapping mechanism to support shared library text replication across a fork system call. The mapping mechanism transparently replicates text or shared library code for child processes that are created by the fork system call. By using unique virtual addresses for each affinity domain, the effective addresses of the child process may remain the same as the parent, even though the physical addresses of the child and parent processes are different.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for supporting shared library text replication, the data processing system comprising:

detecting means for detecting a fork system call by a first process with a first processor affinity domain, wherein the first process requires a shared library which is represented using a set of effective addresses, and wherein the first processor affinity domain includes at least one first processor and a first memory;

responsive to detecting the fork system call, creating means for creating a second process as a replication of the first process;

selecting means for selecting a second processor affinity domain for the second process, wherein the second processor affinity domain includes at least one second processor and a second memory;

determining means for determining if the shared library is replicated in the first processor affinity domain of the first process;

responsive to determining that the shared library is replicated in the first processor affinity domain, determining means for determining whether or not a copy of the replicated shared library of the first processor affinity domain is present in the second processor affinity domain, wherein the replicated shared library in the first processor affinity domain is represented by a first set of physical addresses that are unique within the first processor affinity domain;

responsive to determining that a copy of the replicated shared library is not present in the second processor affinity domain, the data processing system transforming the second processor affinity domain by creating a copy of the replicated shared library in the second processor affinity domain, wherein the copy of the replicated shared library is represented by a second set of physical addresses that are unique within the second processor affinity domain;

mapping means for mapping the set of effective addresses to the first set of physical addresses in the first processor affinity domain; and mapping means for mapping the set of effective addresses to the second set of physical addresses in the second processor affinity domain, wherein the same set of effective addresses are mapped to different sets of physical addresses.

2. The data processing system of claim 1, wherein the first process is a parent process executing in the data processing system and wherein the second process is a child of the parent process.

3. The data processing system of claim 1, wherein the second process includes a separate address space from the first process.

4. The data processing system of claim 1, wherein the replicated shared library is represented by the set of effective addresses and the copy of the replicated shared library is represented by the set of effective addresses, and wherein the replicated shared library in the first processor affinity domain and the copy of the replicated shared library in the second processor affinity domain are represented by the same set of effective addresses.

5. The data processing system of claim 1, further comprising:
   maintaining means for maintaining a usage count for each replication of the replicated shared library in the first processor affinity domain and the second processor affinity domain, wherein the usage count identifies a number of processes associated with each replication;
   decrementing means for decrementing the usage count if an exit call is detected; and
   unloading means for unloading the replication of the replicated shared library if the usage count is zero.

6. The data processing system of claim 1, further comprising:
   mapping means for mapping the set of effective addresses to the first set of physical addresses in the first processor affinity domain by:
      mapping means for mapping the set of effective addresses to a first set of virtual addresses in a first granularity of segments, wherein the first set of virtual addresses are unique to the first processor affinity domain; and
      mapping means for mapping the first set of virtual addresses to the first set of physical addresses in a first granularity of pages; and
   mapping means for mapping the set of effective addresses to the second set of physical addresses in the second processor affinity domain by:
      mapping means for mapping the set of effective addresses to a second set of virtual addresses in a second granularity of segments, wherein the second set of virtual addresses are unique to the second processor affinity domain; and
      mapping means for mapping the second set of virtual addresses to the second set of physical addresses in a second granularity of pages.

7. The data processing system of claim 6, wherein the first set of virtual addresses and the first set of physical addresses are different from the second set of virtual addresses and the second set of physical addresses.

8. The data processing system of claim 6, wherein the first granularity of segments are contiguous regions of the first memory, and wherein each effective segment of the set of effective addresses is identified by an effective segment identifier and each first granularity of segments is identified by a first virtual segment identifier, and further wherein the second granularity of segments are contiguous regions of the second memory, and still further wherein each second granularity of segments is identified by a second virtual segment identifier.

9. The data processing system of claim 8, wherein each first virtual segment identifier is different from each second virtual segment identifier.

10. The data processing system of claim 6, wherein the first granularity of pages are first physical pages that include multiple first physical addresses unique to the first processor affinity domain, and wherein the second granularity of pages are second physical pages that include multiple second physical addresses unique to the second processor affinity domain.

11. A computer program product that is stored in a computer recordable-type medium for supporting shared library text replication, the data processing system comprising:
   first instructions for detecting a fork system call by a first process with a first processor affinity domain, wherein the first process requires a shared library which is represented using a set of effective addresses, and wherein the first processor affinity domain includes at least one first processor and a first memory;
   responsive to detecting the fork system call, second instructions for creating a second process as a replication of the first process;
   third instructions for selecting a second processor affinity domain for the second process, wherein the second processor affinity domain includes at least one second processor and a second memory;
   fourth instructions for determining if the shared library is replicated in the first processor affinity domain of the first process;
   responsive to determining that the shared library is replicated in the first processor affinity domain, fifth instructions for determining whether or not a copy of the replicated shared library of the first processor affinity domain is present in the second processor affinity domain, wherein the replicated shared library in the first processor affinity domain is represented by a first set of physical addresses that are unique within the first processor affinity domain;
   responsive to determining that a copy of the replicated shared library is not present in the second processor affinity domain, sixth instructions for the data processing system transforming the second processor affinity domain by creating a copy of the replicated shared library in the second processor affinity domain, wherein the copy of the replicated shared library is represented by a second set of physical addresses that are unique within the second processor affinity domain;
   seventh instructions for mapping the set of effective addresses to the first set of physical addresses in the first processor affinity domain; and
   eighth instructions for mapping the set of effective addresses to the second set of physical addresses in the second processor affinity domain, wherein the same set of effective addresses are mapped to different sets of physical addresses.

12. The computer program product of claim 11, wherein the first process is a parent process executing in the data processing system and wherein the second process is a child of the parent process.

13. The computer program product of claim 11, wherein the second process includes a separate address space from the first process.

14. The computer program product of claim 11, wherein the replicated shared library is represented by the set of effective addresses and the copy of the replicated shared library is represented by the set of effective addresses, and wherein the replicated shared library in the first processor affinity domain and the copy of the replicated shared library in the second processor affinity domain are represented by the same set of effective addresses.

15. The computer program product of claim 11, further comprising:
   ninth instructions for maintaining a usage count for each replication of the replicated shared library in the first processor affinity domain and the second processor affinity domain, wherein the usage count identifies a number of processes associated with each replication;

tenth instructions for decrementing the usage count if an exit call is detected; and eleventh instructions for unloading the replication of the replicated shared library if the usage count is zero.

16. The computer program product of claim 11, further comprising:

twelfth instructions for mapping the set of effective addresses to the first set of physical addresses in the first processor affinity domain, wherein the twelfth instructions include:

first sub-instructions for mapping the set of effective addresses to a first set of virtual addresses in a first granularity of segments, wherein the first set of virtual addresses are unique to the first processor affinity domain; and second sub-instructions for mapping the first set of virtual addresses to the first set of physical addresses in a first granularity of pages; and thirteenth instructions for mapping the set of effective addresses to the second set of physical addresses in the second processor affinity domain, wherein the thirteenth instructions include:

first sub-instructions for mapping the set of effective addresses to a second set of virtual addresses in a second granularity of segments, wherein the second set of virtual addresses are unique to the second processor affinity domain; and second sub-instructions for mapping the second set of virtual addresses to the second set of physical addresses in a second granularity of pages.

17. The computer program product of claim 16, wherein the first set of virtual addresses and the first set of physical addresses are different from the second set of virtual addresses and the second set of physical addresses.

18. The computer program product of claim 16, wherein the first granularity of segments are contiguous regions of the first memory, and wherein each effective segment of the set of effective addresses is identified by an effective segment identifier and each first granularity of segments is identified by a first virtual segment identifier, and further wherein the second granularity of segments are contiguous regions of the second memory, and still further wherein each second granularity of segments is identified by a second virtual segment identifier.

19. The computer program product of claim 18, wherein each first virtual segment identifier is different from each second virtual segment identifier.

20. The computer program product of claim 16, wherein the first granularity of pages are first physical pages that include multiple first physical addresses unique to the first processor affinity domain, and wherein the second granularity of pages are second physical pages that include multiple second physical addresses unique to the second processor affinity domain.

* * * * *